United States Patent [19]

Kosaka et al.

[11] Patent Number: 4,939,572

[45] Date of Patent: Jul. 3, 1990

[54] VIDEO SIGNAL PROCESSING APPARATUS

[75] Inventors: Yositeru Kosaka, Zushi; Kunio Yamada, Tokyo, both of Japan

[73] Assignee: Victor Company of Japan, Ltd., Yokohama, Japan

[21] Appl. No.: 323,716

[22] Filed: Mar. 15, 1989

[30] Foreign Application Priority Data

Mar. 17, 1988 [JP] Japan .................................. 63-64091

[51] Int. Cl.$^5$ ........................................... H04N 11/22
[52] U.S. Cl. ......................................... 358/11; 358/14
[58] Field of Search ..................................... 358/11, 14

[56] References Cited

FOREIGN PATENT DOCUMENTS 122492 6/1987 Japan .

OTHER PUBLICATIONS

Rhodes, Time Division Multiplex of Time Compressed Chrominance for a Conpatible High Definition Television System, IEEE Transactions on Consumer Electronics vol. CE-28, No. 4, Nov. 1982 pp. 592-601.

Primary Examiner—John W. Shepperd
Attorney, Agent, or Firm—Lowe, Price, Leblanc, Becker & Shur

[57] ABSTRACT

A first video signal processing apparatus for processing a video signal including first and second color difference signals transmitted line-sequentially for outputting simultaneously two fundamental color difference signal, used in SECAM system comprises: a time-adjusting circuit for time-adjusting the first and second color difference signals of successive first, second, and third lines each other; a mixing circuit for combining the first line with the third line of time-adjusted color difference signals at a ratio determined by detected vertical correlation error between first and third lines; a switching circuit for outputting simultaneously the second line of the second color difference signal and an output signal from the mixing circuit being interchanged each other with respect to output terminals therefor in response to a timing signal produced from the video signal.

A second video signal processing apparatus used in the MAC system comprises a second vertical correlation detection circuit for detecting whether hue change exists on the side of first line or third line in addition to the circuit arrangemints of the first video processing apparatus. The second vertical correlation detecting circuit switches over second switch for selecting a mixing ratio.

8 Claims, 4 Drawing Sheets

U: R−Y
V: B−Y

U : R−Y
V : B−Y

VIDEO SIGNAL PROCESSING APPARATUS

BACKGROUND OF THE INVENTION

1. Field of the Invention

This invention relates generally to a video signal processing apparatus and more particularly, the invention relates to a video signal processing apparatus for reproducing color difference signals derived from a video signal wherein two color difference signals are transmitted line-sequentially, such as image processing apparatus of SECAM system and some image processing apparatus of MAC (Multiplexed Analogue Components) system for reproducing parallel color difference signals.

2. Description of the Prior Art

In the SECAM or the C, D, OR $D_2$ type MAC system where two fundamental color difference signals (R−Y, B−Y) are transmitted line-sequentially, as shown in FIG. 4, color difference signals are reproduced through a time aligning process. The transmitted video signal is delayed by lH (horizontal scanning interval), then replacing the transmitted video singal with the delayed signal in response to a timing signal made from the video signal. FIG. 3 shows a prior art video signal processing apparatus of the SECAM system for reproducing color difference signals. FIG. 5 shows a prior art video signal processing apparatus of the MAC system for reproducing color difference signals. In FIGS. 3 and 5, numerals 10, 10′ denote a timing signal generator; numeral 12, a delay circuit of lH; numeral 14, a delay circuit of 2H; numeral 41, an adder, numeral 20, a line switching circuit (hereinbelow also referred to as switching circuit). Reference "DL" shown in these Figures indicates a delay circuit.

In a video signal processing apparatus having the above-mentioned circuit arrangement for reproducing color difference signals, color blurring occurs at a horizontal color boundary of reproduced image where the hue changes greatly. The problem is due to a fact that two or three scanning lines are involved in the time aligning process to reproduce the color boundary. This problem will be further described with FIGS. 3 and 5.

FIG. 4 is a schematic illustration for illustrating the SECAM base band video signal signal applied to a video signal processing apparatus of the SECAM system. In FIG. 4, reference "U" shows color difference component "R−Y"; reference "V", color difference component "B−Y"; reference "n", the number of a scanning line. When the signal indicated by "n" is outputted, one line of the signal block "$U_n$" is outputted as signal "R−Y"; the signal block "$V_{n-1}$" incoming one-scanning interval preceding to the signal block "$U_n$" is outputted as "B−Y" signal. When a subsequent signal indicated as "n+1" is outputted, "Un" is outputted as signal "B−Y". If the hue largely changes from a moment between the line "n−1" and line "n" (indicated by "A" in FIG. 4), color around this point turns to smear, i.e., color blurring occurs at the corresponding the hue of the color of the line "n" is produced in the time aligning process from B−Y of the signal block "$V_{n-1}$" and R−Y of the signal block "$U_n$" which are different each other as separated by the point "A".

FIG. 5 is a prior art video signal processing apparatus for reproducing color difference signals of the MAC system. FIG. 6 is a schematic illustration for illustrating the MAC system video signal inputted into a video signal processing apparatus of MAC system. When color signals of "n" line are processed, the signal block "$U_n$" is outputted at the line switch circuit 20 as signal "R−Y"; a processed signal $(V_{n-1} - V_{n+1})/2$, as signal "B−Y". When color signals of the next line, i.e., of "n+1", a processed signal $(U_n + U_{n+1})/2$ is outputted as "R−Y" signal; the signal block $V_{n+1}$ is outputted. If a large change of hue occurs from a moment between lines "n−1" and "n" (indicated by "B" in FIG. 6) or occurs from a monent between lines "n" and "n+1" (indicated by "C"), signal contents of the signal blocks $V_{n-1}$ and $V_{n+1}$ largely differ each other. In this condition, signals "B−Y" and "R−Y" reproduced by the prior art reproducing circuit shown in FIG. 5 reproduces hue different from that of line "n−1" or former lines as well as different from line "n+1" or subsequent lines; thus, making a smeared hue, i.e., developing color blurring on the displayed image.

In the above-mentioned prior art video signal processing apparatus, even if "V" and "U" components were interchanged each other, the operation would be the same as the afore-mentioned operation, thus, color blurring would occur.

Accordingly, in the prior art video signal processing apparatus including the afore-mentioned prior art video signal processing apparatus, there is a drawback that color blurring develops when a large hue change between scanning lines occurs.

SUMMARY OF THE INVENTION

The present invention has been developed in order to remove the described drawbacks inherent to the conventional video signal processing apparatus including the time aligning circuit.

It is, therefore, an object of the present invention to provide a new and useful video signal processing circuit capable of reproducing color difference signals without producing color blurring on the displayed image even if a large hue change between scanning lines occurs.

According to a feature of the present invention a video signal processing apparatus having a circuit arrangement wherein video signals of time difference by two horizontal scanning periods are aligned each other; then these signals being summed each other, i.e., mixed; these signals being supplied to a switch circuit for being separated into two color difference signals as well as mixing ratio for the above-mentioned summing is controlled in accordance with degree of vertical correlation of the video signal detected by a vertical correlation detection circuit.

In accordance with the present invention there is provided a video signal processing apparatus for processing a video signal including first and second color difference signals transmitted line-sequentially for reproducing simultaneously two color difference signals comprising: time-adjusting circuit for time-adjusting said first and second color difference signals of successive first, second, and third lines of said video signal each other; vertical correlation detection circuit for detecting the degree of vertical correlation between said time-adjusted first and third lines of said first color difference signal; mixing circuit for combining said time-adjusted first line of said first color difference signal with said third line of the first color difference signal at a ratio determined by an output signal from said vertical correlation detection circuit; and switching circuit for outputting to respective terminals said time-adjusted second line of second color difference signal and a signal from said mixing circuit which are interchanged each other in respose to a timing signal produced from said video signal.

In accordance with the present invention there is also provided a video signal processing apparatus for processing a video signal including first and second color difference signals transmitted line-sequentially for reproducing simultaneously two parallel color difference signals comprising: time-adjusting circuit for time-adjusting said first and second color difference signals of sucessive first, second, third, and fourth lines each other; first vertical correlation detection circuit for detecting the degree of vertical correlation between said time-adjusted second and time-adjusted fourth lines of said first color difference signal; second vertical correlation detection circuit for detecting the degree of vertical correlation between said time-adjusted first and said time-adjusted third lines of said second color difference signal; comparing circuit for comparing an output signal of said second vertical correlation detection circuit with a reference value; mixing ratio setting circuit for producing first and second control signals in accordance with an output signal from said first vertical correlation detection circuit; first switching circuit for outputting said first and second control signals being interchanged in response to a signal from said comparing circuit; mixing circuit for combining said time-adjusted second line of first color difference siganl with said time-adjusted fourth line of first color difference signal with a ratio determined by said first and second control signals; and second switching circuit for outputting said time-adjusted third line of color difference signal and a signal from said mixing circuit which are interchanged each other in respose to a timing signal produced from said video signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
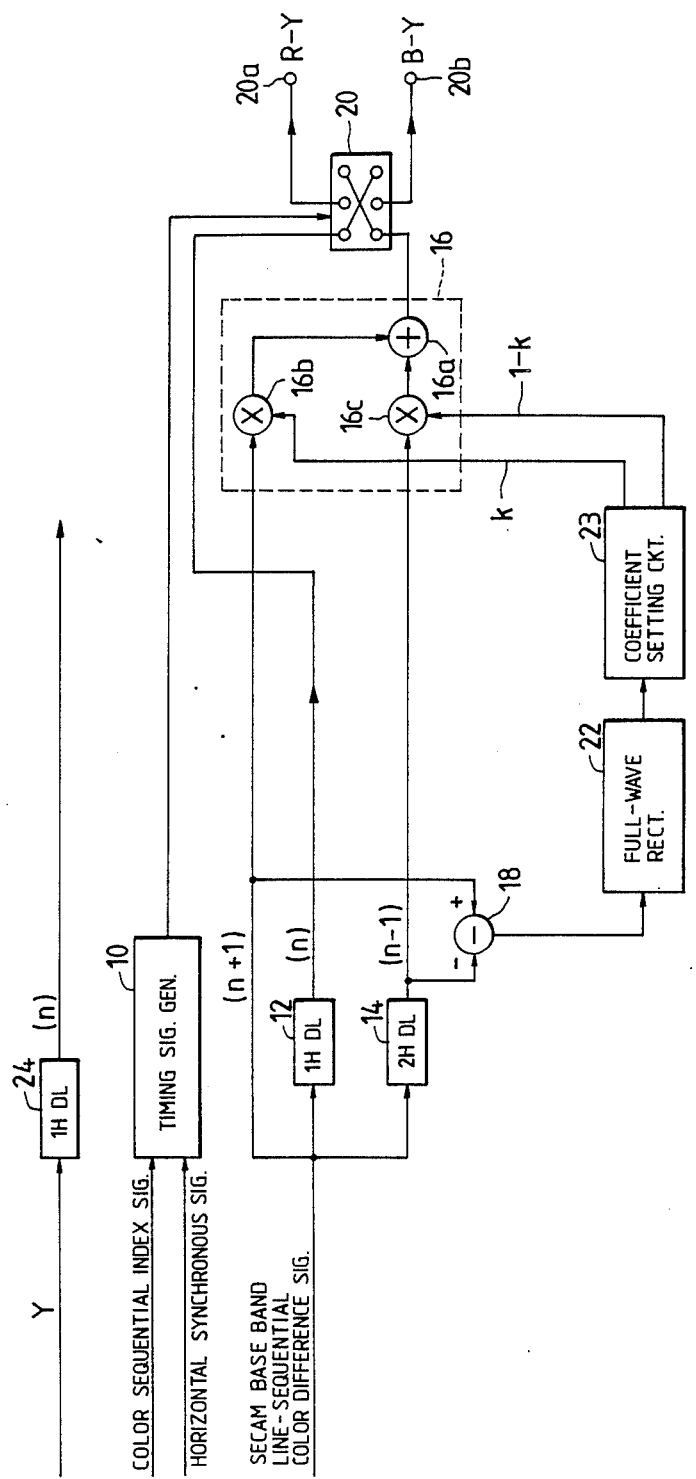
FIG. 1 is a block diagram of a video signal processing apparatus of a first embodiment of the present invention.

Referring now to the drawings, FIG. 1 shows a block diagram of a SECAM type video signal processing apparatus of a first embodiment according to the invention.

In FIG. 1, the video signal processing apparatus comprises a delay circuit 24 for delaying a luminance signal (Y) by 1H (horizontal scanning interval), which is separated from an input video signal by unshown separation circuit; a delay circuit 12 for delaying, by 1H, a SECAM base band line-sequential color difference signals (which is referred to as input color difference signal as to this embodiment) separated by the above-mentioned unshown separation circuit; a delay circuit 14 for delaying the input color difference signal by 2H, these delay circuits 12, 14 being provided for separating into two color difference components "R−Y", "B−Y" from the input color difference signal; a subtractor 18 for subtracting an output signal of the delay circuit 14 from the input color difference signal; a full-wave rectifier 22 for making a DC signal by full-wave rectifying an output signal of the subtractor; a coefficient setting circuit 23 for generating a control signals indicative of two coefficients "k", "k−1" from the DC signal; a variable summing circuit 16 for summing the input color difference signal and an output signal of the delay circuit 14 in accordance with signals from the coefficient setting setting circuit 23; a timing signal generator 10 for prodcing a timing signal responsive to a color sequential index signal separated from the input video signal as well as responsive to a horizontal synchronize signal separated from the input color difference signal; and a line switch circuit 20 for simultaneously outputting signals of the delay circuit 12 and the variable summing circuit 16 with those signals interchanged each other to at the output terminals 20a and 20b in response to the timing signal. The line switch circuit 20 may be formed of known analog switches and level inverters. The delay circuits 12, 14 operates as a time-aligning means. Therefore, the input color difference signal and the output signals of the delay circuits 12, 14 are time-aligned each other. The variable summing circuit 16 operates as mixing means.

In the above-mentioned circuit arrangement, the delay circuit 24 for delaying the luminance signal is provided only for balancing delay cause on the color difference signals in the time-aligning process.

The subtractor 18 detects the degree of vertical correlation between the color difference signals with phase displacement of two horizontal scanning periods by subtracting the output signal of the delay circuit 14 from the input color difference signal. The full-wave rectifier 22 produces a DC signal by rectifying the signal from the subtractor 18 and by smoothing the rectified signal. The coefficient setting circuit 23 of known arrangnent generates the two control signals indicative of coefficients "k", "k−1" respectively in accordance with the DC signal. The DC signal indicating coefficient "k" is applied to a multiplier 16b. And the control signal indicative of coefficient "k−1" having a complementary relation with the other control signal is supplied to a multiplier 16c. The output signals of the delay circuit 12 and the variable summing circuit 16 are applied to a switch circuit 20 where these output signals interchanged each other with respect to the output terminals 20a and 20b in response to the timing signal for outputting signals "R−Y" and "B−Y" simultaneously.

Figure 4:
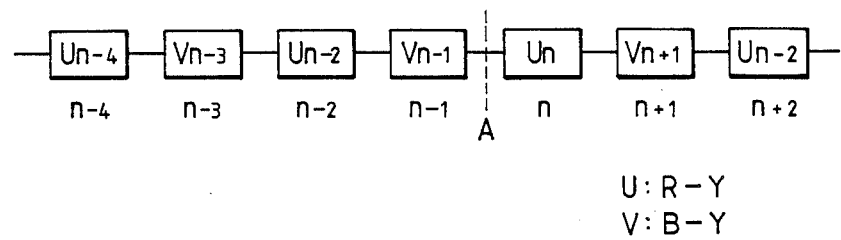
FIG. 4 is an illustration for illustrating operation of the first embodiment and a prior art video processing apparatus.
Figure 5:
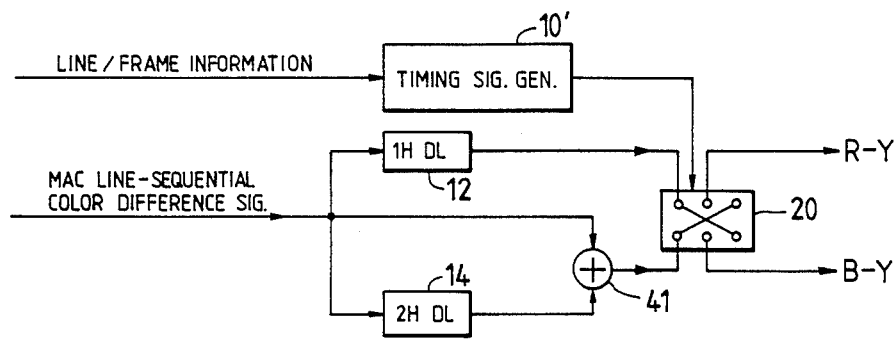
FIG. 5 is a block diagram of prior art MAC type video processing apparatus.

If a large hue change occurs at the point "A", as shown in FIG. 4, it is desirable that synchronization, i.e. time-aligning, is done with combination of signal blocks "$U_n$" and "$V_{n+1}$" having common hue instead of using combination of signal blocks "$U_n$" and "$V_{n-1}$" because of a color blurring with the latter combination. Hue change at "A" is detected by the subtractor 18. The detection signal of the subtractor 18 is formed into a DC signal by the full-wave rectifier 22. When magnitude of the DC signal is large, i.e., vertical correlation error is large, it causes the variable summing circuit 16 decreasing mixing ratio of "$V_{n-1}$" and increasing that of "$V_{n+1}$". As described above, the output signal of variable summing cicuit 16 is controlled in mixing ratio of the color difference signals of lines "n+1" and "n−1" according to the degree of vertical correlation error between these signals. Therefore, color difference signals reproduced from output signals of the variable summing circuit 16 and delay circuit 12 do not generate color blurring on the display image because a degree of mixing undesirable different color components is controlled less in the time-aligning process.

Figure 2:
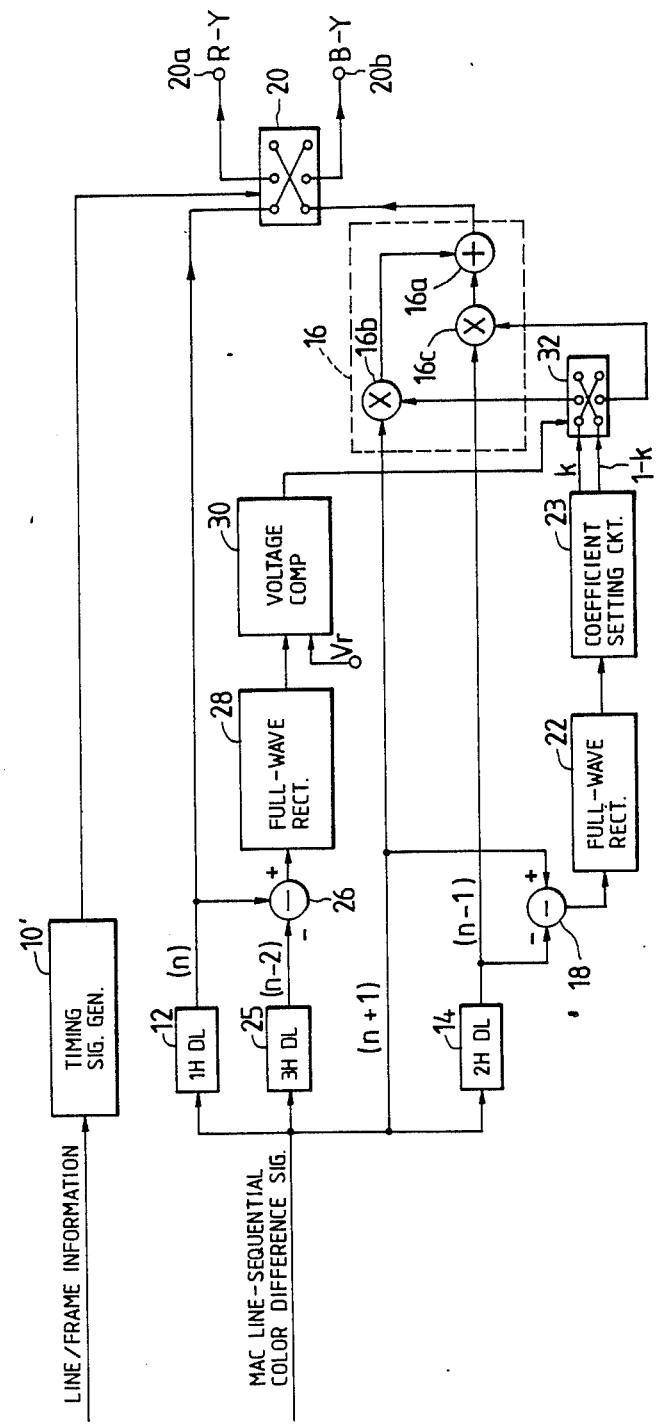
FIG. 2 is a block diagram of a video signal processing apparatus of a second embodiment of the present invention.
Figure 3:
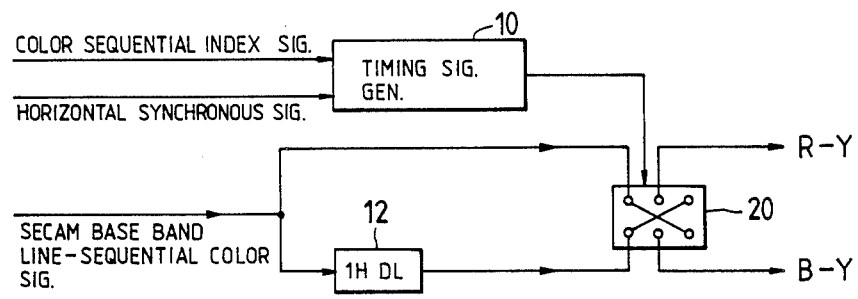
FIG. 3 is a block diagram of a prior art SECAM type video signal processing apparatus.

Hereinbelow will be described a second embodiment of MAC system video signal processing apparatus according to the invention, with referring to FIG. 2. Numerals and references common to block diagram of FIG. 1 are indicated with the same numerals and references as used in FIG. 1. In FIG. 2, MAC line-sequential color imformation (MAC color video signal) is applied to a delay circuit 12 for delaying the same by 1H, a delay circuit 25 for delaying the same by 3H, a summing circuit 16, a subtractor 18, and to a delay circuit 14 for delaying the same by 2H. A subtractor 18 subtracts an output signal of the delay circuit 14 from the MAC color video signal, sending an output to a full-wave rectifier 22. The full-wave rectifier detects vertical correlation error between the line "n−1" and the "n+1". A coefficient setting circuit 23 generates control signals indicative of coefficients "k" and "k−1" in accordance with detected vertical correlation error by the subtractor 18 and full-wave rectifier 22. The coefficient setting circuit 23 sends the control signals indicative of coefficients "k" and "k+1" through a switch 32 to multipliers 16b, 16c of a variable summing circuit 16. A subtractor 26 and a full-wave rectifier 28 detect vertical correlation error between the lines "n" and "n−2" based on signals from the delay circuit 12 and the delay circuit 25. A voltage comparator 30 compares the detected vertical correlation error signal with a reference voltage Vr. The switch 32 outputs control signals indicative of coefficients "k" and "k+1" respectively by interchanging them each other with respect to the multipliers 16b and 16c and in response to an output signal from the voltage comparator 30. The variable summing circuit 16 combines the MAC color video signal with the output signal from the delay circuit 14 at a variable ratio determined by the control signals from the coefficient setting circuit 23. The output signals of the delay circuit 12 and the variable summing circuit 16 are applied to a line switch circuit 20, as described in connection with the first embodiment. The line switch circuit 20 outputs simultaneously the MAC color video signal delayed by 1H at the delay circuit 12 and the output signal of the variable summing circuit 16 with these signals interchanged each other as signals "R−Y", "B−Y" to the output terminals 20a and 20b in response to a timing signal from a timing signal generator 10' which generates the timing signal from a line/frame information separated from the MAC color video signal by unshown separation means.

Figure 6:
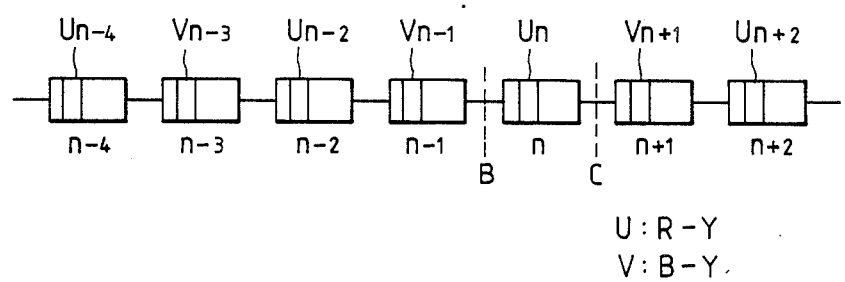
FIG. 6 is an illustration for illustrating operation of the second embodiment and a prior art video processing apparatus.

As shown in FIG. 2, the video processing circuit of this embodiment further includes the delay circuit 25, subtractor 26, full-wave rectifier 28, voltage comparator 30, and switch 32 in comparison with the first embodiment. The reasons are as follows:

If a large hue change detected only based on the vertical correlation error detected at the full-wave rectifier 22, it is impossible to distinguish the change between the lines "n+1" and "n" (shown by "C" in FIG. 6) from the change between the lines "n" and "n−1" (shown by "B" in FIG. 6). The subtractor 26 and full-wave rectifier 28 detect vertical correlation between the lines "n" and "n−2". When the error output voltage is larger than the reference voltage Vr, the comparator 30 detects the hue change at "B"; when the error output voltage is smaller than the reference voltage Vr, the hue change exists at "C". Thus, the switch 32 outputs the control signals of "k−1" to "k" as is or being reversed in accordance with the timing of the hue change. Therefore, if vertical correlation error detected at "B", the variable summing circuit 16 increases mixing amount of color difference component of line "n+1" applied to the multiplier 16b in accordance with the coefficient "k" and decreases the mixing amount of color difference component of line "n−1" in accordance with the coefficient "1−k". On the other hand, when vertical correlation error detected at "C", control signals of interchanged "k" and "1−k" are applied to the multipliers 16b, 16c. The variable summing circuit 16 sums these signals with the component of the line "n+1" decreased; with the component of the line "n−1" increased. This means mixing ratio of these signals changes in a range from "k" to "k−1" or reversely in accordance with the timing when the vertical correlation error is detected.

As described above, the video signal processing apparatus according to the invention is capable of reproducing color diffrence signals of a video signal transmitted line-sequentially without developing color blurring on the displayed image when large hue change occures during the transmission of the displayed image. This is because the video processing apparatus controls mixing ratio of signals with time difference of two horizontal scanning periods in accordance with vertical correlation error detected, so that mixing amount of the signal having high vertical correlation is increased.

What is claimed is:

1. A video signal processing apparatus for processing a video signal including first and second color difference signals transmitted line-sequentially for outputting simultaneously two fundamental color difference signals of a television system comprising:
   (a) time-adjusting means for time-adjusting said first and second color difference signals of successive first, second, and third lines of said video signal relative to each other;
   (b) vertical correlation error detection means for detecting the degree of vertical correlation error between said time-adjusted first and third lines of said first color difference signal;
   (c) mixing means for combining said time-adjusted first line of said first color difference signal with said third line of said first color difference signal at a ratio determined by an output signal from said vertical correlation error detection means; and
   (d) switching means for outputting simultaneously said time-adjusted second line of said second color difference signal and an output signal from said mixing means being interchanged each other with respect to output terminals therefor in response to a timing signal produced from said video signal.

2. A video signal processing apparatus as claimed in claim 1, wherein said mixing means comprises;
   (a) mixing ratio setting means for producing first and second control signals in response to an output signal from said vertical correlation error detection means, said first and second control signals having a complementary relation each other;
   (b) a first multiplier for multiplying said time-adjusted third line of said first color difference signal by a first multiplying factor determined by said first control signal;
   (c) a second multiplier for multiplying said time-adjusted first line of said first color difference signal by a second multiplying factor determined by said second control signal; and
   an adder for adding signals from said first and second multipliers to each other.

3. A video signal processing apparatus as claimed in claim 1, wherein said vertical correlation error detection means comprises a subtractor for subtracting said time-adjusted first line of said first color difference signal from said time-adjusted third line of said first color difference signal and a full-wave rectifier for full-wave rectifying an output signal from said subtractor.

4. A video signal processing apparatus for processing a video signal including first and second color difference signals transmitted line-sequentially for outputting simultaneously two fundamental color difference signals of a television system comprising:
   (a) time-adjusting means for time-adjusting said first and second color difference signals of sucessive first, second, third, and fourth lines of said video signal relative to each other;
   (b) first vertical correlation error detection means for detecting the degree of vertical correlation error between said time-adjusted second and time-adjusted fourth lines of said first color difference signal;
   (c) second vertical correlation detection means for detecting the degree of vertical correlation error between said time-adjusted first and said time-adjusted third lines of said second color difference signal;
   (d) comparing means for comparing an output signal of said second vertical correlation error detection means with a reference value;
   (e) mixing ratio setting means for producing first and second control signals responsive to an output signal from said first vertical correlation error detection means;
   (f) first switching means for outputting said first and second control signals being interchanged each other in response to a signal from said comparing means;
   (g) mixing means for combining said time-adjusted second line of said first color difference signal with said time-adjusted fourth line of said first color difference signal with a ratio determined by said first and second control signals; and
   (h) second switching means for outputtting simultaneously said time-adjusted third line of said second color difference signal and an output signal from said mixing means being interchanged each other with respect to output terminals therefor in respose to a timing signal produced from said video signal.

5. A video signal processing apparatus as claimed in claim 4, wherein said first and second control signals have a complementary relation in level each other.

6. A video signal processing apparatus as claimed in claim 4, wherein said second vertical correlation error detection means comprises a subtractor for subtracting said time-adjusted first line of said second difference color signal from said time-adjusted third line of said second difference color signal and a full-wave rectifier for full-wave rectifying an output signal from said subtractor.

7. A video signal processing apparatus as claimed in claim 4, wherein said first vertical correlation error detection means comprises a subtractor for subtracting said time-adjusted second line of said first difference color signal from said time-adjusted fourth line of said first difference color signal and a full-wave rectifier for full-wave rectifying an output signal from said subtractor.

8. A video signal processing apparatus as claimed in claim 4, wherein said mixing means comprises;
   a first multiplier for multiplying said fourth line of said first color difference signal by a first multiplying factor determined by said first control signal;
   a second multiplier for multiplying said time-adjusted second line of said first color difference signal by a second multiplying factor determined by said second control signal; and
   an adder for adding signals from said first and second multipliers to each other.

* * * * *